United States Patent [19]

Sudo et al.

[11] Patent Number: 5,394,755
[45] Date of Patent: Mar. 7, 1995

[54] FLOW QUANTITY TEST SYSTEM FOR MASS FLOW CONTROLLER

[75] Inventors: Yoshihisa Sudo, Shiki; Minoru Ito, Inagi, both of Japan

[73] Assignee: CKD Corporation, Aichi, Japan

[21] Appl. No.: 128,086

[22] Filed: Sep. 29, 1993

[30] Foreign Application Priority Data

Sep. 30, 1992 [JP] Japan .................................. 4-286986

[51] Int. Cl.$^6$ .............................................. G01F 1/34
[52] U.S. Cl. ...................................................... 73/861
[58] Field of Search ........................................... 73/861

[56] References Cited

U.S. PATENT DOCUMENTS

| | | | |
|---|---|---|---|
| 4,285,245 | 8/1981 | Kennedy | 73/861 |
| 4,364,413 | 12/1982 | Bersin et al. | 73/861 |
| 4,497,202 | 2/1985 | Mermelstein | |
| 4,687,020 | 8/1987 | Doyle | |

*Primary Examiner*—Richard E. Chilcot, Jr.
*Assistant Examiner*—Harshad Patel
*Attorney, Agent, or Firm*—Finnegan, Henderson, Farabow, Garrett & Dunner

[57] ABSTRACT

In a flow quantity test system for a mass flow controller, a gas source for measurement is provided to supply gas for measurement. A cutoff valve for start of measurement is connected at its inlet port to the gas source for measurement and is connected at its outlet port to an inlet port of the mass flow controller. The cutoff valve for start of measurement is opened to flow the gas for measurement therethrough and closed to block the flow of the gas for measurement therethrough. A pressure gauge is provided to detect pressure of the gas for measurement appearing at the outlet port side of the cutoff valve for start of measurement. A microcomputer is provided to close the process gas cutoff valve and open the cutoff valve for start of measurement to change pressure detected by the pressure gauge. The microcomputer further closes the cutoff valve for start of measurement after pressure detected by the pressure gauge has reached predetermined pressure and measures lowering of pressure detected by the pressure gauge dependent on lapse of time after closing of the cutoff valve for start of measurement. Thereafter the microcomputer tests measuring precision of the mass flow controller in accordance with the measured lowering of the detected pressure.

7 Claims, 7 Drawing Sheets

FLOW QUANTITY TEST SYSTEM FOR MASS FLOW CONTROLLER

BACKGROUND OF THE INVENTION

1. Field of the Invention

The present invention relates to a flow quantity test system for a mass flow controller usable with a gas system in a semiconductor fabrication process, and more particularly to a flow quantity test system capable of testing precision in flow quantity measurement for a mass flow controller that has been assembled in the gas system.

2. Discussion of the Prior Art

In an apparatus for forming a membrane, an apparatus for dry etching and the like, utilized in semiconductor fabrication process, used are such a specific material gas as for instance silane, phosphine or the like, a corrosive gas such as a chroline gas or the like and a highly combustible gas such as a hydrogen gas or the like. For usage of these gases, a flow quantity of each gas must be managed in a significantly strict manner due to the following reasons.

The first reason, is the fact that the quantity of the gas flow affects directly the quality of the process. That is, precision in the gas flow quantity enormously influences the membrane quality in a process for forming a membrane and also the quality of the circuit in the etching process.

Another reason, is the fact that most of these kind of gases have injurious or explosive properties. Thus, these gases after usage may not be permitted to directly exhaust into the atmosphere. As a result, it is required to prepare means for eliminating injury according to the kind of gases. The means for eliminating injury is restrained usually in its processing ability, resulting often in flowing out of an injurious gas into the environment and damaging of the means for eliminating injury when the flow quantity becomes more than a permissible value.

Furthermore, still another reason is the fact that these gases, especially high purity and dust-free gases usable in semiconductor fabrication processes are expensive and that storage in large amounts of the gases is difficult because of time limit in use caused by natural deterioration depending on the kind of the gases.

Meanwhile, the actual flow quantity of these gases requested by process equipment is little or at most 500 sccm. For this reason, a conventional mass flow controller is disposed within a gas line to flow each gas with an optimum flow quantity for every kind of gas. A setting flow quantity for the mass flow controller may be altered in relation to an applied voltage thereto to meet with changes of the process recipe.

For the purpose of controlling a small flow quantity, the mass flow controller for gas process of this kind is provided with a capillary tube that acts to monitor flow quantity according to its operation. Meanwhile, solid bodies may be separated in the capillary tube from a material gas for forming a membrane among gases flowing through the mass flow controller due to the property of the mass flow controller, often causing change in a flow quantity capacity of the capillary tube. If this change is caused, the relationship between an applied voltage and the actual flow quantity of the mass flow controller is naturally changed. In other words, because the actual flow quantity changes without any change in setting of the applied voltage, the process may be prevented from being stable. In case such a change actually occur, the setting of the applied voltage must be corrected in order to flow a proper gas flow quantity. In this instance, it is required to measure the actual flow quantity of the mass flow controller.

Since monitoring of the flow quantity becomes impossible due to logging of the capillary tube when the separated solid bodies are further accumulated, it is difficult to cope with the above-mentioned prevention of the stability of the process. Such continuous usage of the mass flow controller prior to the accumulation induces to apply to the process instrument particles that are undesirable in fabrication of semiconductors, causing undesirable results. In this case, the mass flow controller must therefore be replaced with a new one. Individual differences in relationship between the applied voltage and actual flow quantity of the mass flow controller may not be neglected even if the mass flow controller is the same type and a fastening degree of a joint with the conduit system affects the actual flow quantity. It is therefore required to measure the actual flow quantity of the newly replaced mass flow controller.

However, it is hardly carried out till now to measure the actual flow quantity of the mass flow controller because it is difficult to measure the actual flow quantity of the mass flow controller that has been assembled in the conduit system. Thus, an applied voltage is provisionally set by intuition and experience of a worker for measurement of the actual flow quantity. A process is carried out to determine the quality of the provisional value according to the quality of the process and these procedures are repeated to determine an optimum setting value.

As a result, it takes time to determine the provisional value. This causes lowering the actual availability of the process apparatus and has costs including the consumption of various gases and test wafers in the process.

SUMMARY OF THE INVENTION

It is, therefore, a primary object of tile present invention to provide a flow quantity test system for a mass flow controller, capable of measuring the actual flow quantity of the mass flow controller assembled in a gas system to rapidly detect a voltage setting value giving a correct gas flow quantity in proper correspondence with individual difference and aged deterioration of the mass flow controller to thereby enable stable operation and high availability of the process using a gas .

According to the present invention, the foregoing object is attained by providing a flow quantity test system for a mass flow controller provided within a gas system wherein a process gas cutoff valve is opened to supply a process gas from a process gas source to the mass flow controller such that the mass flow controller applies the process gas from the process gas cutoff valve therethrough to a process chamber and is closed to block the supply of the process gas to the mass flow controller. The flow quantity test system comprises:

a gas source for supplying a gas for measurement, a cutoff valve for start of measurement having an inlet port connected to the gas source for measurement and an outlet port connected to an inlet port of the mass flow controller, the cutoff valve for start of measurement being opened to flow the gas for measurement therethrough and closed to block the flow of the gas for measurement therethrough, a pressure gauge for detecting pressure of the gas for measurement appearing at the outlet port side of the cutoff valve for start of measurement, and means for closing the process gas cutoff valve and opening the cutoff valve for start of measurement to change pressure detected by the pressure gauge, for closing the cutoff valve for start of measurement after pressure detected by the pressure gauge has reached predetermined pressure, for measuring lowering of pressure detected by the pressure gauge dependent on lapse of time after closing of the cutoff valve for start of measurement and for testing measuring precision of the mass flow controller in accordance with the measured lowering of the detected pressure.

Preferably, in the flow quantity test system, the means is arranged to test the measuring precision of the mass flow controller when the mass flow controller is disposed within the gas system. The flow quantity test system further comprises memory means for storing initial data of the lowering of pressure dependent on the lapse of time after the closing of the cutoff valve for start of measurement, and control means for comparing data of the measured lowering of the detected pressure with the initial data of the lowering of pressure after operation of the gas system to test abnormality of the mass flow controller.

It is also preferable that in the flow quantity test system, at least two of the mass flow controllers are connected in parallel with each other at the outlet port side of the cutoff valve for start of measurement.

BRIEF DESCRIPTION OF THE DRAWINGS

Other objects, features and advantages of the present invention will be readily appreciated from the following detailed description of a preferred embodiment thereof when considered with reference to the accompanying drawings, in which.

DESCRIPTION OF THE PREFERRED EMBODIMENT

Hereinafter, an embodiment of a system for testing the actual flow quantity of a gas according to the present invention that is embodied and assembled in a gas line system will be explained with respect to the accompanying drawings.

Figure 1:
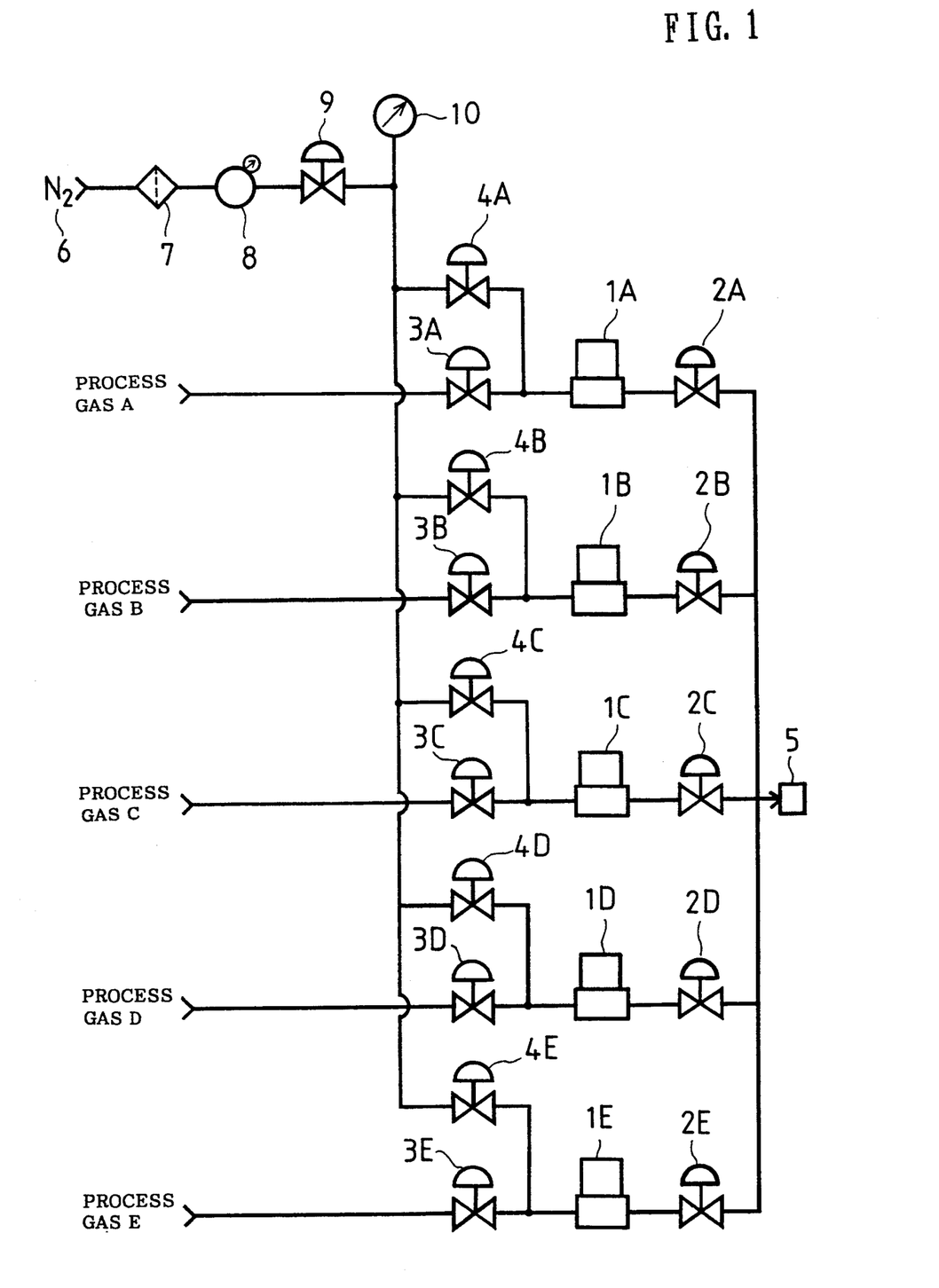
FIG. 1 is a block diagram illustrating a construction of an embodiment of a flow quantity test system for a mass flow controller in accordance with the present invention.
Figure 2:
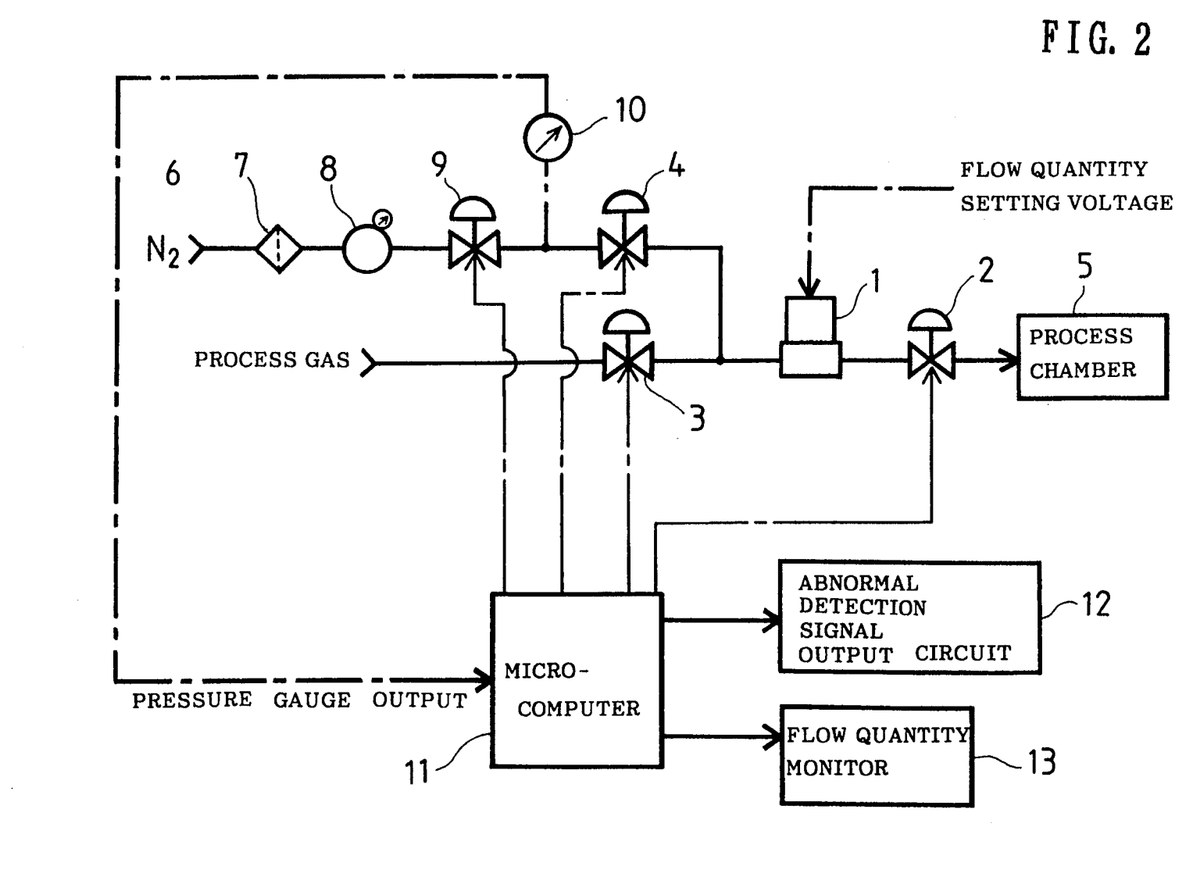
FIG. 2 is a block diagram illustrating a construction of a flow quantity test system for a mass flow controller having plural process gas lines and a gas line for measurement.

FIG. 2 is a block diagram of a gas system assembling therein the system for testing the actual flow quantity of a gas according to the present invention. In FIG. 1, there is illustrated a construction that five kinds of process gases (A-E) are supplied to a process chamber 5 through first cutoff valves (3A-3E) and second cutoff valves (2A-2E) between which mass flow controllers (1A-1E) are disposed, respectively. Moreover, a nitrogen gas from a common high pressure nitrogen source 6 for flow quantity measurement is reduced into predetermined pressure by way of a filter 7 and a reducing valve 8 and flows through a cutoff valve 9 for start of measurement and is then divided and joins each gas line by way of the cutoff valves (4A-4E) for connection.

A pressure gauge 10 is utilized for measuring pressure of a nitrogen gas between the cutoff valve 9 and the cutoff valves (4A-4E). The process chamber 5 is utilized for performing dry etching, forming a membrane in vapor phase, oxidating thermally and so on. In addition, the high pressure nitrogen source 6 for flow quantity measurement may be used commonly with a gas source for purge that is utilized when the process chamber 5 is opened into the atmosphere and so on.

When carrying out normal process recipe in the gas system, each of the cutoff valves (4A-4E) is closed to prevent flow of the nitrogen gas from the high pressure nitrogen source 6 for flow quantity measurement to each gas line and also to prevent reverse flow of each process gas to the pressure gauge 10. Under this state, each of the mass flow controllers (1A-1E) is applied a setting voltage thereto and each of the cutoff valves (2A-2E,3A-3E) is opened to flow each of the process gases with a necessary flow quantity into the process chamber 5. Within the process chamber 5, a wafer for treatment is accommodated. The wafer is heated appropriately, for which plasma application or the like is done, and necessary treatment for the wafer is carried out in relation to the action of the process gas.

Now, in such a gas system, it is assumed that the mass flow controllers (1A-1E) are replaced with new ones. In general, each mass flow controller is provided therein with a capillary tube. Therefore, individual difference in relationship between a voltage applied to each mass flow controller and the actual flow quantity may not be neglected, even if the mass flow controllers are of the same type. Furthermore, the relationship between a voltage applied to each mass flow controller and the actual flow quantity is affected by the fastening degree of each joint with pipe arrangement. Thus, for the purpose of good operation in process it is desirable to reset an applied voltage corresponding to the required actual flow quantity by measuring the actual flow quantity of the gas through the mass flow controller that has been assembled in the system. It is also desirable to correct the applied voltage in necessity, because the characteristic of the mass flow controllers (1A-1E) have a tendency to change due to carrying out the actual recipe many times.

In the gas system of the embodiment, the system for testing the actual flow quantity of gas has been assembled. It is therefore possible to reset the applied voltage corresponding to the required actual flow quantity by measuring the actual flow quantity of the gas flowing through each of the mass flow controllers (1A-1E).

Procedures for measuring the actual flow quantity of a gas in the gas system of the embodiment will be explained with reference to FIGS. 2 and 3. In FIG. 2, only one process gas line in the gas system of FIG. 1 is illustrated for simplification and a microcomputer 11 or the like that are not shown in FIG. 1 are also illustrated.

The microcomputer 11 is utilized to analyze data from the pressure gauge 10. A flow quantity monitor 13 displays a gas flow quantity that is calculated based on a changing velocity of pressure. When an abnormal signal is detected at this stage, an abnormal signal output circuit 12 issues an alarm. In addition, the cutoff valve 4 may be eliminated in a system having only one process gas line.

For measuring the actual flow quantity of a gas in the gas system of FIG. 2, the cutoff valve 3 is firstly closed to block supply of the process gas. Next, the secondary pressure of the reducing valve 8 is adjusted in a pressure value of 5 kgf/cm$^2$ and each of the cutoff valves 9, 4 and 2 is opened to blow and exhaust the remaining process gas through the process chamber 5 to an exhaust side (not shown).

Then, a flow quantity of the mass flow controller 1 is set. At this stage, the nitrogen gas from the nitrogen gas source 6 flows through the filter 7, reducing valve 8 and cutoff valve 4 and flows out through the mass flow controller 1 with the setting flow quantity to the exhaust side. When the nitrogen gas from the high pressure nitrogen source 6 is supplemented through the reducing valve 8, pressure in a gas line portion between the cutoff valve 9 and the mass flow controller 1 is maintained in a value of 5 kgf/cm$^2$. Thus, the pressure gauge 10 indicates 5 kgf/cm$^2$.

When the cutoff valve 9 is closed at this stage, the supplement of the nitrogen gas to the gas line portion between the cutoff valve 9 and the mass flow controller 1 is blocked whereas the flow out of the nitrogen gas through the mass flow controller 1 continues. Therefore, pressure in the gas line portion between the cutoff valve 9 and the mass flow controller 1, namely the indication of the pressure gauge 10 gradually lowers down to the atmospheric pressure or 0 kgf/cm$^2$. The time required for the indication value to become the atmospheric pressure changes according to the flow quantity of the mass flow controller 1 or the applied voltage. The relationship between the indication value of the pressure gauge 10 at this stage and time lapsing after opening of the cutoff valve 2 is shown in a graph of FIG. 3 as an example of the actually measured value.

Incidentally, discharge time when a gas has discharged from a constant capacity V with a constant flow quantity Q is investigated as a general discussion. The discharge time means time required till pressure of the gas lowers from the initial pressure to the atmospheric pressure according to discharge of the gas.

Firstly, the following equation of state for a gas is investigated.

$$PV = gRT \quad (1)$$

wherein P, g, R and T indicate pressure, gas weight, a gas constant and temperature respectively. The equation (1) indicates so-called Boyle-Charles' law.

On a basis of the equation (1), a gas weight g1 within the capacity V when pressure is P1 and temperature T is constant is indicated by the following equation;

$$g1 = P1V/RT \quad (2)$$

Likewise, a gas weight g2 within the capacity V at pressure p2 is indicated by the following equation;

$$g2 = P2V/RT \quad (3)$$

A change g3 of the gas weight when the pressure changes from P1 to P2 under constant temperature T within a constant capacity V of a gas is given by the following equation;

$$g3 = g1 - g2 = (P1 - P2) \cdot (V/RT) \quad (4)$$

A gas constant R when the gas is a nitrogen gas is calculated. It is assumed that the gas is 1 mol of the nitrogen gas at normal condition(0° C., 1 atm).

Since P = 1.033 kgf/cm$^2$ (1 atm),
T = 273 K (0° C.),
V = 22400cm$^3$ (22.4 liters), and
g = 0.028 kgf (based on a molecular weight of N$^2$), the following equation is given on a basis of tile equation (1).

$$R = PV/gT = 3027 \text{ cm/K} \quad (5)$$

Thus, the following equation is given based on the equations (4) and (5) when temperature T is room temperature 293 K (20° C.).

$$g3 = (V/887000) \cdot (P1-P2) \text{ kgf} \quad (6)$$

Assuming that the gas is a weight g4 of the nitrogen gas at the room temperature 293 K(20° C.), 1.033 kgf/cm$^2$ (1 atm) and 1 cm$^3$, the following equation is given by the equations (1) and (5).

$$g4 = PV/RT = 1.165 \cdot 10^{-6} \text{ kgf} \quad (7)$$

When a constant flow quantity Q sccm (sccm indicates a volume flow quantity per 1 minute when converted into state of 1 atm and 20° C.) of a gas is discharged from the constant capacity V for t seconds, a weight g5 of the exhaust gas is defined by the product of Q, discharge time and g4. Thus, the following equation is given by using the equation (6).

$$g5 = Q \cdot (t/60) \cdot 1.165 \cdot 10^{-6} \text{ kgf} \quad (8)$$

By the way, a change in weight of the gas within the constant capacity V is equal to a weight of the discharged gas. Thus, g3=g5 in the respective equations (6) and (8), and the following equation is derived.

$$t = 58 \cdot V \cdot (P1-P2)/Q \quad (9)$$

As a result, it is understood that the discharged time is inversely proportional to the volume flow quantity Q.

Next, the above-mentioned investigation is adapted to the embodiment. A capacity V of the gas line portion between the cutoff valve 9 and the mass flow controller 1 in the gas system of the embodiment is about 5 to 30 cm$^3$, and V=12.4 cm$^3$ has been obtained by the actual measurement in the system that the inventors used. We now consider the case in which pressure in the gas line portion between the cutoff valve 9 and the mass flow controller 1 lowers from 5 kgf/cm$^2$ to the atmospheric pressure, P1-5 kgf/cm$^2$, and P2-0 kgf/cm$^2$. Assuming that the discharged flow quantity Q or the flow quantity of the mass flow controller 1 is 200 sccm, the following theoretical value is obtained by calculating the equation (9).

t = 17.98 seconds

Figure 3:
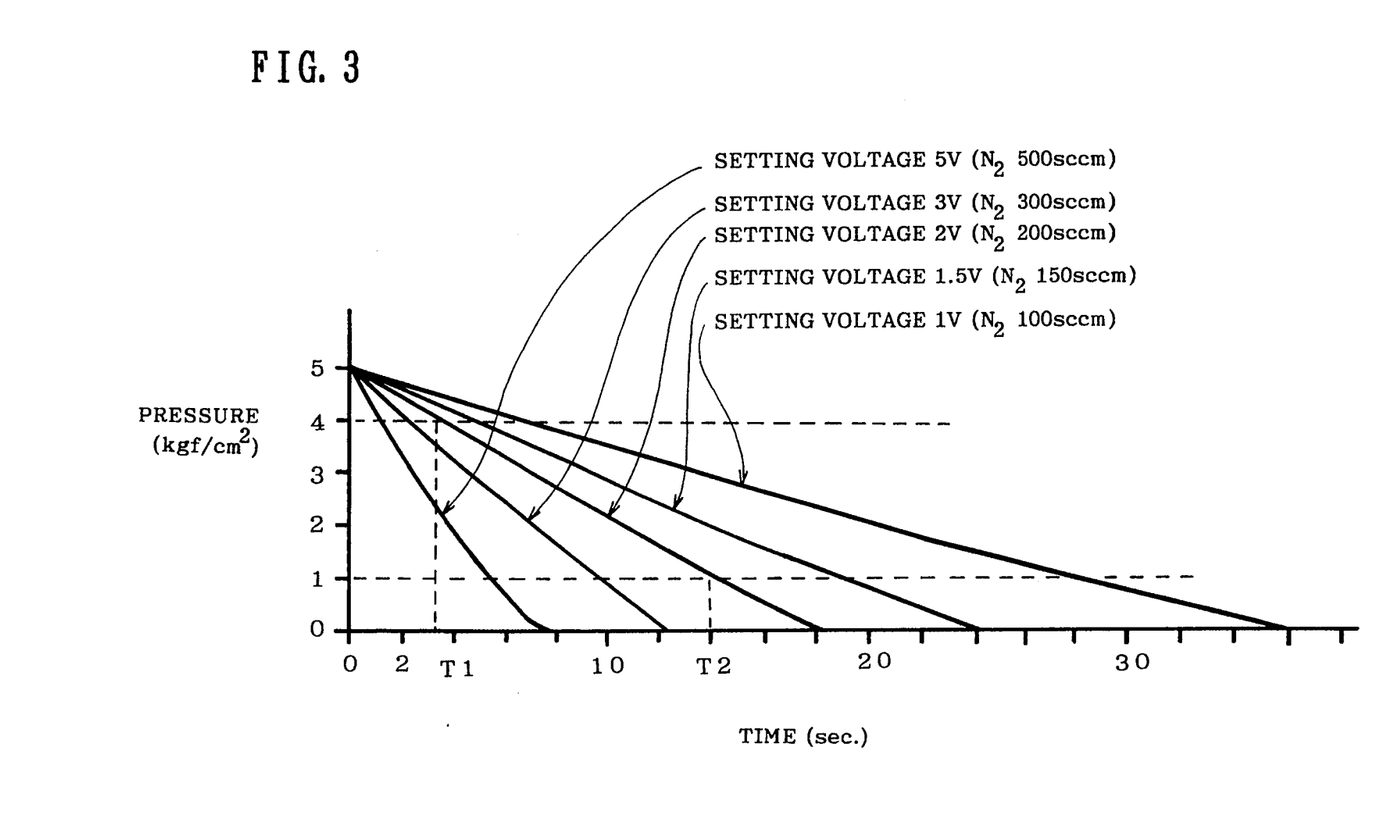
FIG. 3 is a graph indicating relationship between the first side pressure and discharge time of the mass flow controller.

Among examples of the actually measured values shown in the graph of FIG. 3, the value defined by the setting flow quantity 200 sccm may be read discharge time of about 18 seconds that accords very well with the theoretical value. It may be recognized that the remaining setting flow quantities shown in the graph of FIG. 3 also accord with the theoretical value by calculating the equation (9).

Assuming that the initial pressure is not 5 kgf/cm$^2$ but 4 kgf/cm$^2$, it is also possible to read discharge time from 4 kgf/cm$^2$ till 1 kgf/cm$^2$ (not the atmospheric pressure). In case of for instance the setting flow quantity 200 sccm, it takes about 3 seconds from start of discharge till 4 kgf/cm$^2$ (see T1 of the figure), and also takes about 14 seconds from start of discharge till 1 kgf/cm$^2$ (see T2 of the figure). Thus, the discharge time from 4 kgf/cm$^2$ till 1 kgf/cm$^2$ is about 11 seconds. Likewise, it is possible to read discharge time from 4 kgf/cm$^2$ till 1 kgf/cm$^2$ in the case of the other setting flow quantities.

The advantage of the discharge time from 4 kgf/cm$^2$ till 1 kgf/cm$^2$ as described above is that there is an improvement of measuring precision. Assuming that start of measurement corresponds to 5 kgf/cm$^2$, an instant after the cutoff valve 9 has been closed corresponds to the timing for start of measurement. Thus, a delicate time lag in closing operation of the valve causes an error in measurement. Assuming that the end of measurement corresponds to the atmospheric pressure, a flow velocity lowers near the atmospheric pressure. It is therefore difficult to strictly determine the timing for end of measurement. In case the discharge time is determined to correspond to 4 kgf/cm$^2$ to 1 kgf/cm$^2$, it is possible to measure the discharge time in high precision without the problems described above.

Figure 4:
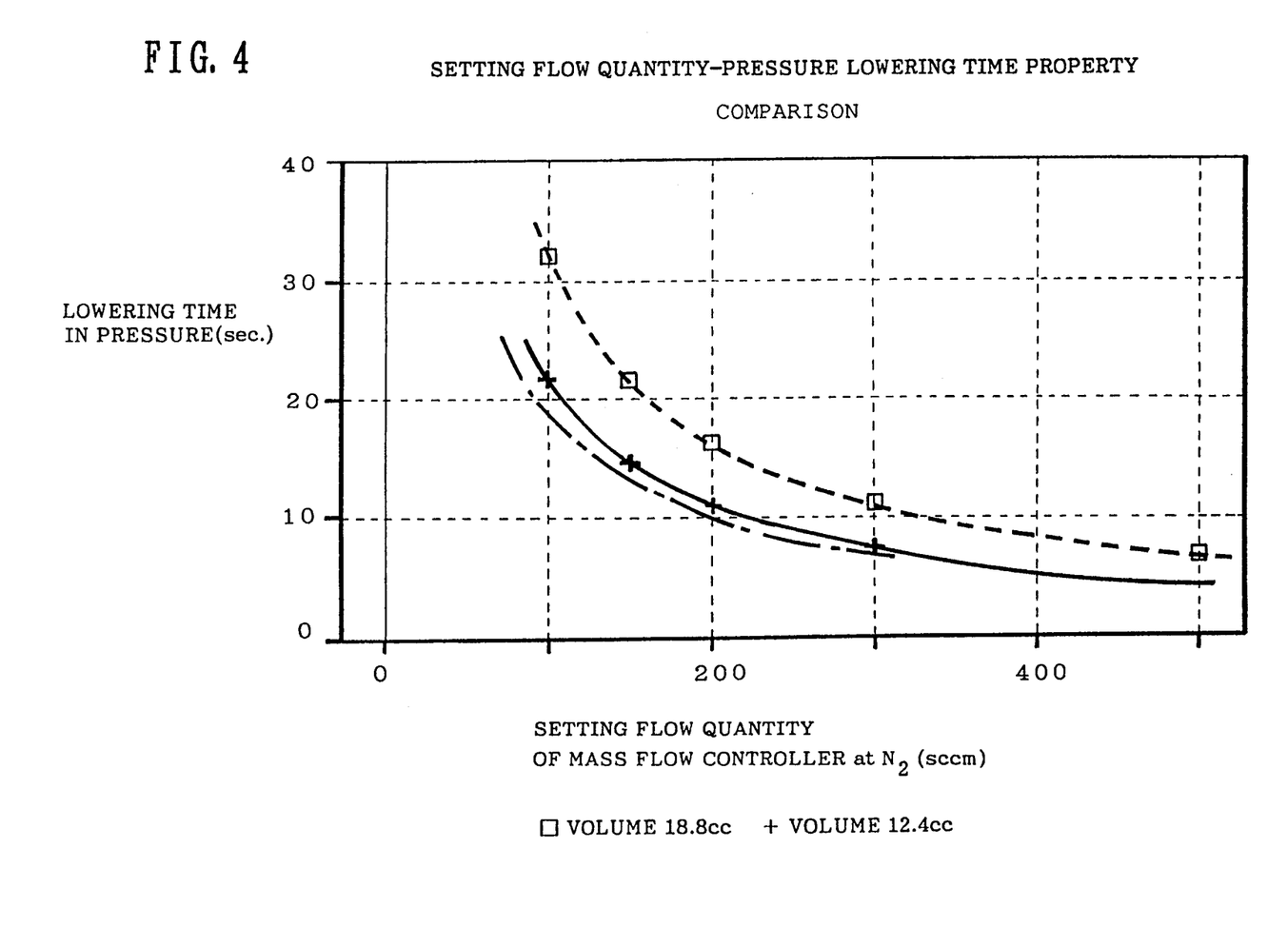
FIG. 4 is a graph indicating relationship between a setting flow quantity and pressure lowering time of the mass flow controller.

FIG. 4 depicts a graph indicating the relationship between the discharge time from 4 kgf/cm$^2$ till 1 kgf/cm$^2$ read from the graph of FIG. 3) and the setting flow quantity of the mass flow controller 1 with solid lines. Although the graph of FIG. 4 also indicates an example of a measured result ( shown by a dotted line of FIG. 4) in a similar gas system wherein a capacity of a gas line portion between a cutoff valve 9 and a mass flow controller 1 is 18.8 cm$^3$, contents described from now on are explained with respect to the gas system wherein the capacity of the gas line portion between the cutoff valve 9 and the mass flow controller 1 is 12.4 cm$^3$. Additionally, reproducibility of this measurement is excellent. According to the experimentation of the inventors, it has been observed that hardly any change in measurement is found even if the same measurement is repeated so long as it is performed with a clean nitrogen gas.

In case that the gas system shown in FIG. 2 is newly assembled, the actual flow quantities necessary for carrying out the actual recipe in good manner are different from each other in relation to the volume and delicate internal location of the process chamber 5 and the like. It is therefore necessary to repetitively perform trial of the actual recipe and to predetermine an applied voltage of the mass flow controller 1 giving a good result. If tile above-mentioned discharge time is measured based on the predetermined applied voltage, it is possible to obtain the actual flow quantity (hereinafter called a required flow quantity) using the graph of FIG. 4.

Now, in case the mass flow controller 1 has been replaced with a new one, individual difference is of the mass flow controller in relationship between an applied voltage and the actual flow quantity may not be neglected. Thus, an applied voltage for obtaining a required flow quantity in the newly replaced mass flow controller 1 must be determined. For this reason, it is required to measure discharge time and also to predetermine an applied voltage (hereinafter called a normal voltage) for obtaining discharge time (read from the graph of FIG. 4) corresponding to the required flow quantity.

When the actual recipe is repetitively carried out again and again, the relationship between the applied voltage and actual flow quantity of the mass flow controller 1 changes sometimes. This may be recognized by the fact that the process result may not be maintained in good condition in spite of application of the normal voltage to the mass flow controller 1. That the process result is not maintained in good condition means that in case of for an instance process for forming a membrane, the thickness and quality (a refractive index or the like) of the formed membrane deviates from normal values and uniformity becomes bad. In this case, it is necessary that the applied voltage of the mass flow controller 1 be corrected to obtain a required flow quantity.

The mass flow controller 1 in which the deviation from such normal values becomes large produces particles, causing yield to worsen. It is therefore preferable to issue some alarm at the time when the deviation exceeds a certain threshold value.

In the gas system of the embodiment, an initial state is therefore previously memorized in the microcomputer 11. When the deviation has already exceeded the threshold value in relation to a result of measurement for correction, the abnormal signal output circuit 12 functions to issue alarm therefrom. This function is realized by a normal value initialization mode and a measurement mode, the normal value initialization mode being performed immediately after the mass flow controller 1 is replaced with a new mass flow controller 1 to measure a normal voltage of the new mass flow controller 1, and the measurement mode being performed when a deviation from a normal state occurs in the mass flow controller 1. In the measurement mode, the deviation is corrected to issue alarm in necessity.

Figure 5:
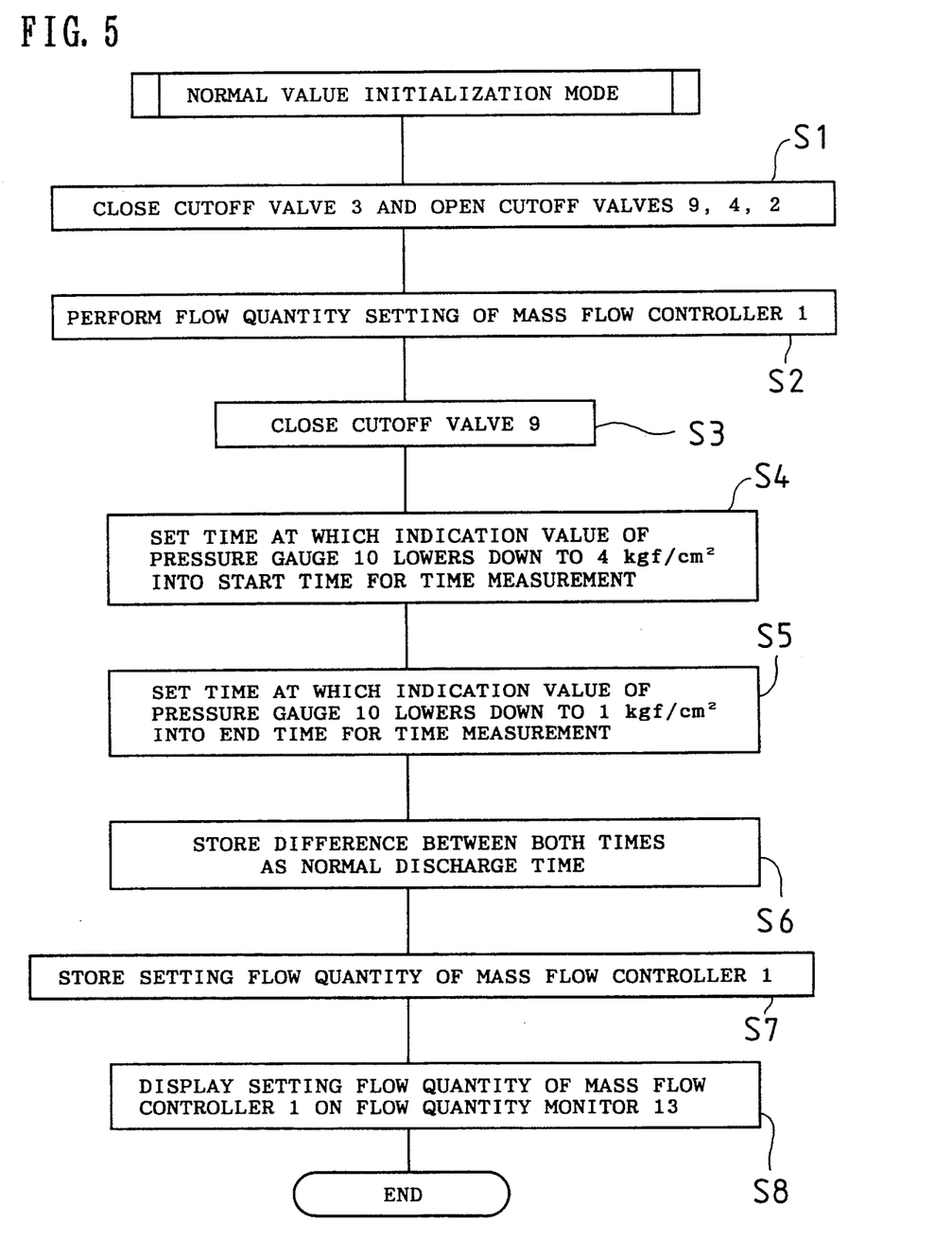
FIG. 5 is a flow diagram indicative of a normal value initialization mode.

Firstly, the normal value initialization mode is explained based on a flow diagram of FIG. 5 and FIG. 2, on the premise that the mass flow controller 1 is replaced with a new one and that a normal voltage for the new mass flow controller 1 has just been measured. At this stage, the secondary setting pressure of the reducing valve 8 is 5 kgf/cm$^2$, and the cutoff valve 3 is closed to block supply of the process gas to its right side direction.

Initially, preparation of the measurement system is performed at a step S1. Namely, the cutoff valves 9,4 and 2 are electromagnetically opened with the cutoff valve 3 closed. Then, a nitrogen gas from the high pressure nitrogen gas source 6 for flow quantity measurement flows to the exhaust side through the gas line portion between the cutoff valve 9 and the mass flow controller 1. Then, pressure in the gas line portion between the cutoff valve 9 and the mass flow controller 1 is maintained in 5 kgf/cm$^2$ by operation of the reducing valve 8. At this stage, the pressure gauge 10 indicates 5 kgf/cm$^2$. The indicating value of the pressure gauge 10 is always applied to the microcomputer 11 as a signal.

Subsequently, flow quantity setting for the mass flow controller 1 is performed at a step S2. This setting is done by applying a normal voltage of the mass flow controller 1 that is previously measured. When the cutoff valve 9 is closed at a step S3, the pressure in the gas line portion between the cutoff valve 9 and the mass flow controller 1 starts to gradually lower. Thus, the indicating value of the pressure gauge 10 also lowers gradually.

Then, the time at which the indication value of the pressure gauge 10 lowers down to 4 kgf/cm$^2$ is set into the start time for time measurement (at a step S4). Likewise, the time at which the indication value of the pressure gauge 10 lowers down to 1 kgf/cm$^2$ is set into the end time for time measurement (at a step S5). The difference between both the times is in turn stored into the microcomputer 11 as normal discharge time(at a step S6).

In this instance, a setting flow quantity of the mass flow controller 1 is also stored into the microcomputer 11 as a normal flow quantity (at a step S7) and displayed by the flow quantity monitor 13 (at a step S8).

The above-mentioned contents define the normal value initialization mode.

Figure 6:
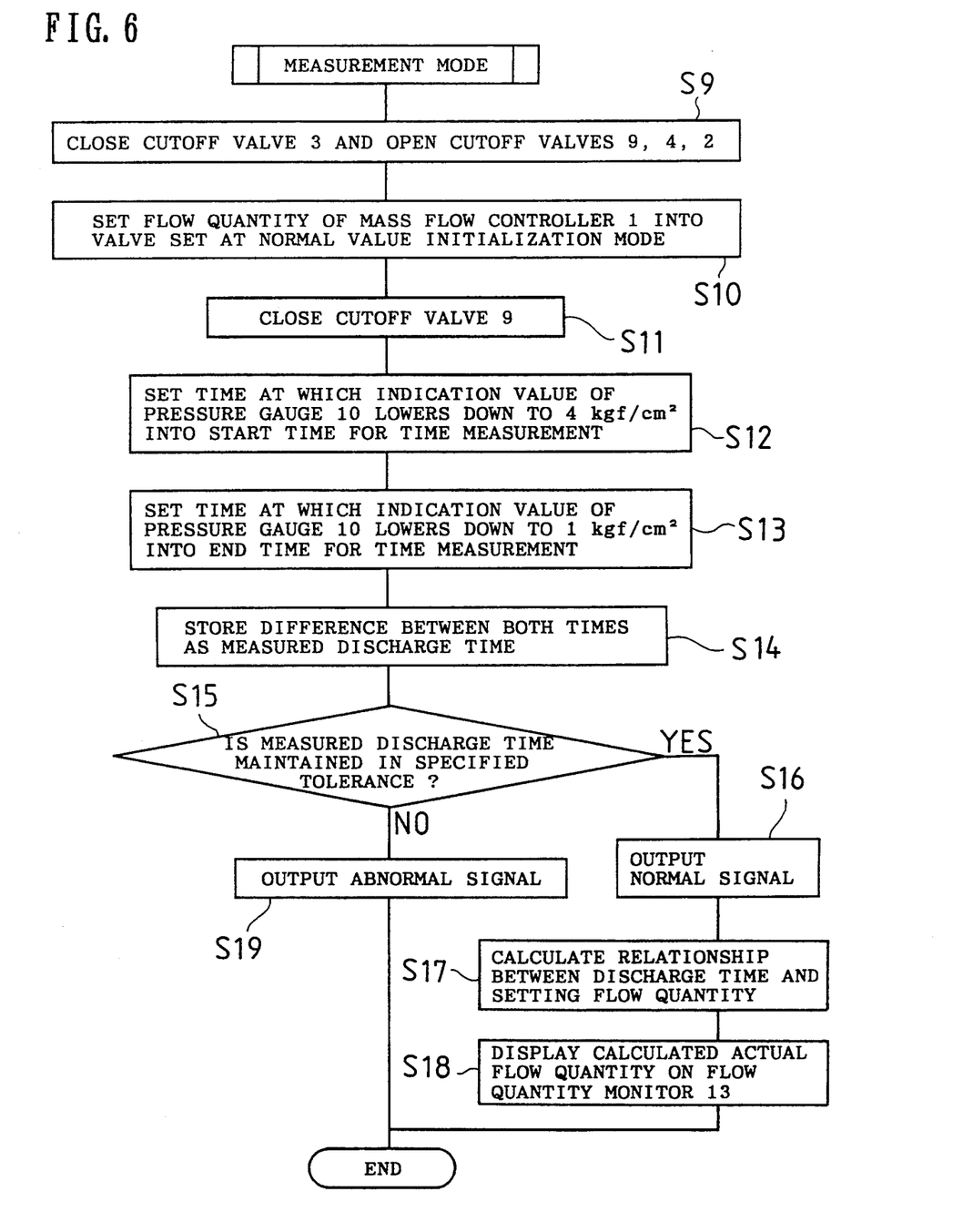
FIG. 6 is a flow diagram indicative of a measurement mode.

The measurement mode is explained based on a flow diagram of FIG. 6 and FIG. 2. The measurement mode is a mode that is performed when there occurs a deviation from a normal state in relationship between the applied voltage and actual flow quantity of the mass flow. On the premise that the measurement mode is performed, it is required in advance that the cutoff valve 3 is closed to stop supply of the process gas and also that the secondary pressure of the reducing valve 8 is set into 5 kgf/cm$^2$.

Initially, preparation for the measurement system is performed at a step S9. Namely, the cutoff valves 9, 4 and 2 are electromagnetically opened with the cutoff valve 3 closed. Then, the nitrogen gas from the high pressure nitrogen gas source 6 for flow quantity measurement flows towards the exhaust side through the gas line portion between the cutoff valve 9 and the mass flow controller 1 to discharge the remaining process gas. In this instance, by operation of the reducing valve 8, pressure in the gas line portion between the cutoff valve 9 and the mass flow controller 1 is maintained in 5 kgf/cm$^2$ that is indicated by the pressure gauge 10. The indication value of the pressure gauge 10 is always applied to the microcomputer 11 as a signal.

Flow quantity setting of the microcomputer 11 is in turn performed at a step S10. This setting is done by applying to the mass flow controller 1 the same voltage as that in the normal value initialization mode. When the cutoff valve 9 is closed at a step 11, the pressure in the gas line portion between the cutoff valve 9 and the mass flow controller 1 starts to gradually lower, causing the indication value of the pressure gauge 10 to gradually lower.

Then, the time at which the indication value of the pressure gauge 10 lowers down to 4 kgf/cm$^2$ is set into the start time for time measurement (at a step S12). Likewise, the time at which the indication value of the pressure gauge 10 lowers down to 1 kgf/cm$^2$ is set into the end time for time measurement (at a step S13). The difference between both the times is in turn stored into the microcomputer 11 as normal discharge time(at a step S14).

Thereafter, at step 15 it is decided whether or not a deviation between the discharge time and the measurement discharge time is maintained within a specified tolerance (for instance, within±10% of the normal discharge time). When the decision that the deviation is maintained in the specified tolerance is made (S15:YES), a normal signal is issued at a step S16.

Then, the microcomputer 11 operates a curve (shown by a dot and dash line of FIG. 4) depicting the relationship between the current discharge time and setting flow quantity according to the normal discharge time and normal flow quantity stored in the execution of the normal value initialization mode (at a step S17). Subsequently, the actual flow quantity that is obtained by substituting the operated result for the measurement discharge time is displayed by the flow quantity monitor 13 (at a step S18). In this instance, a correct voltage necessary for flowing a required flow quantity at the actual condition is also calculated.

When the decision that the deviation from the normal discharge time of the measurement discharge time is not maintained in the specified tolerance is made at step S15 (S15:NO), an alarm is issued at a step S19 from the normal signal output circuit 12.

The above-mentioned contents define the measurement mode.

In case the measurement discharge time has not deviated from the normal discharge time as the result of carrying out the measurement mode, it is recognized that there is no abnormality in the mass flow controller 1. Thus, it is required to seek other causes as the cause of process abnormality.

In case the measurement discharge time deviates from the normal discharge time and is maintained within the specified tolerance, it seems that the relationship between the applied voltage and actual flow quantity of the mass flow controller 1 causes a deviation from its normal condition and also that the deviation has a high possibility of being the cause for process abnormality. The later actual recipe is therefore carried out with the correct voltage in replacement of the normal voltage.

In case the measurement discharge time deviates from the normal discharge time and is within the specified tolerance, the relationship between the applied voltage and actual flow quantity of the mass flow controller 1 deviates largely from its normal condition. Under this condition, there is the possibility that the mass flow controller 1 produces particles that are disliked by the process. Thus, the mass flow controller 1 should be replaced with a new one. When the mass flow controller 1 has been replaced with the new one as previously described, it is of course required to perform the initial measurement and normal value initialization mode, as previously described.

The gas system of the embodiment is provided with means for measuring the actual flow quantity in the actual conduit system. Thus, the determination as to whether or not the applied voltage of the mass flow controller 1 should be corrected and whether or not the mass flow controller 1 should be exchanged may be performed in good precision and efficiency, as previously described. As a result, it is possible to improve the yield of the semiconductor. Furthermore, it is possible by employing the system of the embodiment to reduce cost for consuming process gases and test wafers and time necessary for trial and analyzation of the result.

Next, the case that the above-mentioned discharge time measurement is carried out in the system having many process gas lines shown in FIG. 2 will be investigated. In this case, the mass flow controllers (1A–1E) each must be measured separately.

When for instance the mass flow controller 1A in the line of the process gas A is measured, filling up of the nitrogen gas for measurement into the gas line portion between the cutoff valve 9 and the mass flow controller 1 is performed (at step S1 in the normal value initialization mode and at step S9 in the measurement mode) by opening of the cutoff valves 9, 4A and 2A, on the premise that the cutoff valve 3A is closed to block supply of the process gas A and that the cutoff valves (4B-4E) are closed to prevent flowing out of the nitrogen gas for measurement towards the other gas lines. In addition, explanation of the other measuring procedures is eliminated because it is the same as that of the previously described procedures.

Each of the remaining mass flow controllers in the remaining gas lines is measured likewise. In this instance, a capacity of the gas line portion between the cutoff valve 9 and the mass flow controller 1 is different strictly in each gas line to be measured.

In case abnormality of each mass flow controller has been detected based on this test, the individual mass flow controllers each are tested.

In the system for testing a flow quantity, the determination as to whether or not the applied voltage of each of the mass flow controllers (1A-1E) should be corrected and whether or not each of the mass flow controllers (1A-1E) should be exchanged may be efficiently performed, as previously described.

Furthermore, the plural mass flow controllers may be tested by the single pressure gauge, resulting in reduction in the production cost in comparison with employment of plural pressure gauges. And it is possible by employing the system of the embodiment to reduce cost for consuming process gases and test wafers and time necessary for trial and analyzation of the result. The effect is especially remarkable for the system having many process lines.

In addition, the present invention may not be limited to the embodiment of which various modifications and improvements are of course possible without departing from the scope of the present invention.

For instance, pressure in filling up of the nitrogen gas for measurement as previously described, pressure at the start of the discharge time, pressure at the end of the same discharge time, the specified tolerance thereof and the like may be modified as necessary without limitation to the above-mentioned values.

Figure 7:
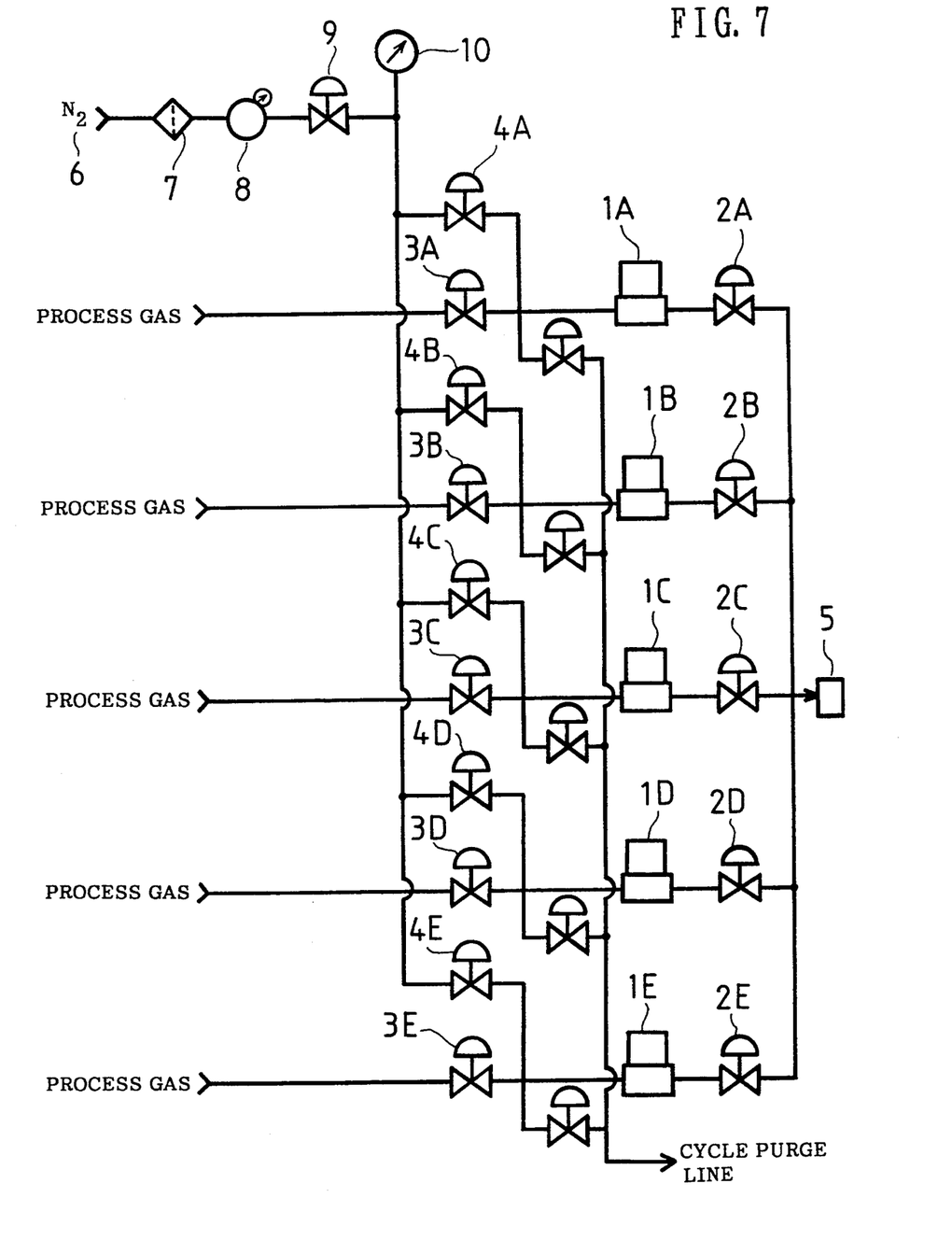
FIG. 7 is a block diagram indicating a construction of a flow quantity test system for a mass flow controller having a cycle purge line.

Although in the above embodiment the nitrogen gas is used as a gas for measurement, it may be replaced with other gases that are inactive and clean if commercially available. The present invention may be applicable to a system having a cycle purge line shown in FIG. 7.

What is claimed is:

1. A flow quantity test system for a mass flow controller provided within a gas system wherein a process gas cutoff valve is opened to supply a process gas from a process gas source to said mass flow controller such that said mass flow controller applies the process gas from said process gas cutoff valve therethrough to a process chamber and is closed to block the supply of the process gas to said mass flow controller, the flow quantity test system comprising:

a separate gas source for supplying a gas for measurement, a cutoff valve for start of measurement having an inlet port connected to said gas source for measurement and an outlet port connected to an inlet port of said mass flow controller, said cutoff valve for start of measurement being opened to flow the gas for measurement therethrough and closed to block the flow of the gas for measurement therethrough, a pressure gauge for detecting pressure of the gas for measurement appearing at the outlet port side of said cutoff valve for start of measurement, and means for closing said process gas cutoff valve and opening said cutoff valve for start of measurement to change pressure detected by said pressure gauge, for closing said cutoff valve for start of measurement after pressure detected by said pressure gauge has reached predetermined pressure, for measuring the lowering of pressure detected by said pressure gauge dependent on lapse of time after closing of said cutoff valve for start of measurement and for testing measuring precision of said mass flow controller in accordance with the measured lowering of the detected pressure.

2. A flow quantity test system as claimed in claim 1, wherein said means is arranged to test the measuring precision of said mass flow controller when said mass flow controller is disposed within said gas system, further comprising memory means for storing initial data of the lowering of pressure dependent on the lapse of time after the closing of said cutoff valve for start of measurement, and control means for comparing data of the measured lowering of the detected pressure with the initial data of the lowering of pressure after operation of said gas system to test abnormality of said mass flow controller.

3. A flow quantity test system as claimed in claim 1, wherein at least two of said mass flow controllers are connected in parallel with each other at the outlet port side of said cutoff valve for start of measurement.

4. A flow quantity test system as claimed in claim 2, wherein at least two of said mass flow controllers are connected in parallel with each other at the outlet port side of said cutoff valve for start of measurement.

5. A method of testing actual flow quantity of a mass flow controller provided within a gas system wherein a process gas cutoff valve is between a process gas source, which contains a process gas, and said mass flow controller, said process gas cutoff valve controlling flow of the process gas into said mass flow controller, and said mass flow controller controlling flow of the process gas into a process chamber, comprising:

providing a separate measuring gas source for flowing measuring gas to the process chamber through the mass flow controller, cutting off the flow of the process gas into the mass flow controller, initiating the flow of the measuring gas to the process chamber through the mass flow controller and thereafter cutting off the flow of the measuring gas, measuring pressure at a point on an input side of the mass flow controller as a function of time, and determining the actual flow quantity based on the measured pressure.

6. A method for determining performance of a mass flow controller in a gas system, wherein a process gas flows through the mass flow controller to a process chamber, and a separate measuring gas from a separate measuring gas source flows through the mass flow controller to a process chamber during a testing phase, comprising:

stopping the flow of the process gas through the mass flow controller, initiating the flow of said measuring gas through the mass flow controller to the process chamber, stopping the flow of said measuring gas through the mass flow controller, measuring a drop off in pressure at a point between the measuring gas source and the mass flow controller, determining a ratio of the loss in pressure to time, and comparing the ratio to a predetermined ratio.

7. A method of testing actual flow quantity of a mass flow controller as claimed in claim 5, further comprising the steps of:

measuring and storing an initial actual flow quantity based on the measured pressure when said mass flow controller is disposed within said gas system, comparing the actual flow quantity based on the measured pressure after operation of said gas system with said initial actual flow quantity to test abnormality of said mass flow controller.

* * * * *